UNITED STATES PATENT OFFICE.

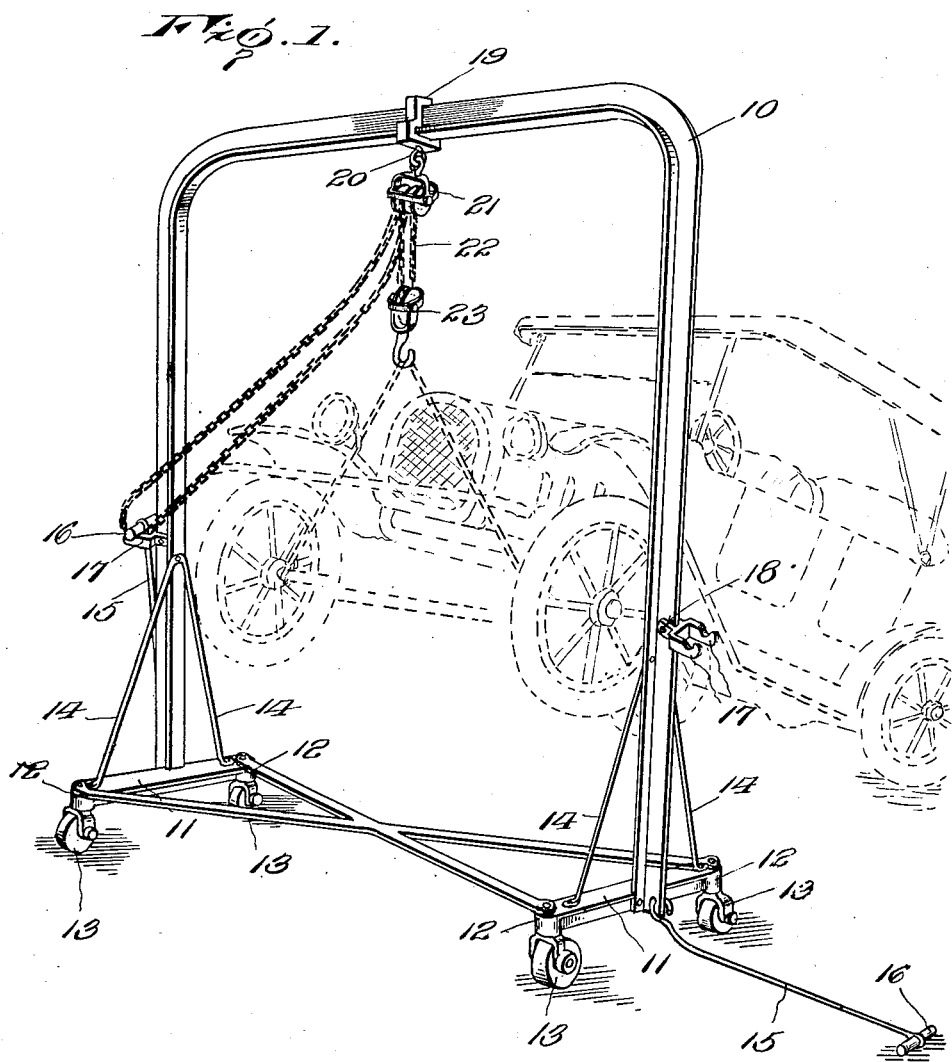
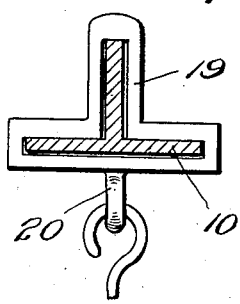
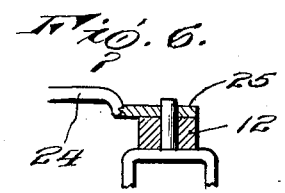

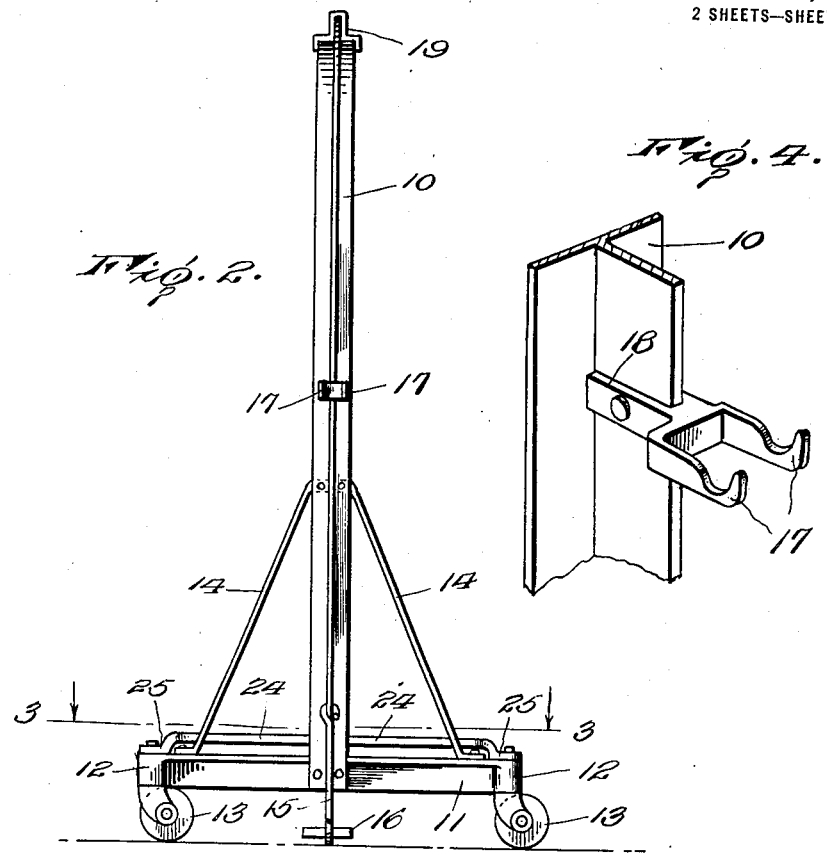
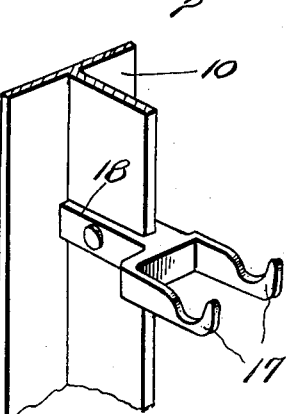
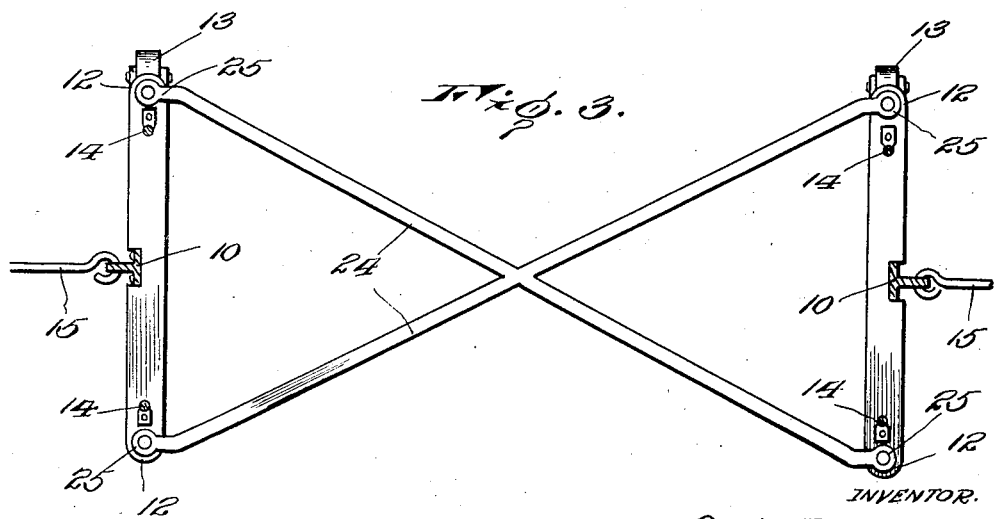

GEORGE W. JACKSON, OF BELLEVILLE, ILLINOIS.

HOISTING-TRUCK.

1,355,479.  Specification of Letters Patent.  Patented Oct. 12, 1920.

Application filed April 7, 1919. Serial No. 287,952.

*To all whom it may concern:*

Be it known that I, GEORGE W. JACKSON, citizen of the United States, residing at Belleville, in the county of St. Clair and State of Illinois, have invented certain new and useful Improvements in Hoisting-Trucks, of which the following is a specification.

This invention relates to an improved hoisting truck and has as its primary object to provide a device of this character particularly adapted for use about garages, machine shops, or other similar places, for elevating automobile bodies, engines, or other heavy objects.

The invention has as a further object to provide a hoisting truck of such nature that the truck with its load suspended therefrom may be readily moved from place to place.

And a still further object of the invention is to provide a truck so constructed that the truck frame may be arranged to extend over the forward end portion of an automobile when the front end of the automobile may be elevated and suspended from the frame in such position that access may be readily had to the engine pan, crank case, and other adjacent parts of the engine and vehicle.

In the drawings:

Figure 1 is a perspective view showing the manner in which my improved truck may be employed for suspending the front end of an automobile in elevated position, the automobile being shown in dotted lines, and the truck brace employed being removed, Fig. 2 is an end elevation of the truck, Fig. 3 is a sectional view taken on the line 3—3 of Fig. 2 and looking downwardly, this view particularly showing the brace member employed when moving the truck from place to place with a load suspended therefrom, Fig. 4 is a detail perspective view showing one of the keepers employed for holding the handles normally elevated in inactive position, Fig. 5 is a transverse sectional view particularly showing the hanger of the device, and Fig. 6 is a vertical section through one of the legs shown in Fig. 3 viewed from the side of the device.

In carrying the invention into effect I employ a substantially U-shaped arch bar or frame 10. This bar is substantially T-shaped in cross section and suitably connected to the lower ends of the bar are cross bars 11. These cross bars are also substantially T-shaped in cross section and are formed at their ends with enlarged bearings 12. A pair of supporting rollers 13 is carried by each bar and these rollers have swiveled connection with the bearings 12. Bracing the bar 10 with respect to the cross bars are brace rods 14. The intermediate portions of the rods are bolted or otherwise secured to the arch bar and the end portions of the rods thence diverge downwardly at opposite sides of the end portions of the bar and are bolted or otherwise secured to the end portions of the cross bars 11. The arch bar will thus be rigidly sustained with respect to the cross bars. Connected with the lower end portions of the arch bar 10 are handles 15. At their inner ends these handles are formed with loops engaged through suitable openings in the web flange of the arch bar and are thus freely connected therewith while, at their outer ends, the handles are equipped with cross pins 16. In connection with the handles I employ keepers for normally sustaining the handles elevated in inactive position. One of these keepers is shown in detail in Fig. 4 of the drawings. As there illustrated, each of said keepers is in the nature of a fork having spaced fork arms 17 and provided with parallel lugs 18 straddling the web flange of the arch bar to which the lugs are riveted or otherwise secured. Adjacent their outer ends, the fork arms are formed in their upper edges with oppositely disposed notches. As shown at the left in Fig. 1, the handles 15 may be swung upwardly between the fork arms 17 of the keepers, when the cross pins 16 of the handles may be engaged in the notches 18, so that the handles will thus be held in a substantially upright position out of the way. It will also be noted that when a handle is allowed to fall to the ground, as shown at the right in Fig. 1, the cross pin in the free end of the handle may be utilized as an anchor to prevent moving of the truck as it is necessary only to drive hook members or staples into the ground over the cross pin as will be readily understood.

Slidable longitudinally upon the upper horizontal portion of the arch bar 10 is a yoke or hanger 19. As shown in detail in Fig. 5, this hanger is shaped to fit the arch bar so that the hanger will thus be held against canting about the axis of the bar. Depending from the lower side portion of the hanger is a medially disposed loop or eye 20 and engaged through this eye is the hook of a hoisting block 21. Associated with this block is a hoisting chain 22 which carries a pulley 23. The block and pulley are conventionally shown and may be of any approved type. Thus, as will be seen, the truck may be readily moved from place to place and positioned over different objects when, by properly manipulating the hoisting block and pulley 23, the object which it is desired to elevate may be readily hoisted to be held suspended upon the arch bar 10. This arch bar is preferably of such height that the truck may be readily positioned over the bodies of automobiles, automobile engines, or like objects, so that such objects may be readily elevated and suspended upon the truck. In Fig. 1 of the drawings I have shown the manner in which the truck may be employed for holding the front end of an automobile suspended, the automobile being shown in dotted lines. When so used, a rope or other suitable flexible element is connected with the front axle of the vehicle. The hook of the pulley 23 is then engaged with the intermediate portion of this rope, when by properly operating the chain of the hoisting block 21, the front end of the automobile may be readily hoisted and held suspended from the arch bar 10. When so raised, a workman can, as will be readily seen, easily gain access to the engine pan, the engine crank case, or adjacent parts of the vehicle.

A pair of the handles 15 is, as shown in the drawings, preferably employed so that the truck may be readily pulled in either direction without the necessity for turning the truck around. In order to avoid distortion of the arch bar 10 such as might occur when the truck is being moved from place to place with its load suspended therefrom, I provide a brace member of the type shown in Fig. 3 of the drawings. This brace member is constructed of crossed brace bars 24 which are integrally joined at their intersection and are, as shown in detail in Fig. 6, provided at their ends with eyes 25 snugly engaging over the upper end portions of the trunnions of the rollers 13. In this connection it will be observed that the end portions of the brace bars are deflected to extend at substantially right angles to the cross bars while the trunnions of the rollers 13 extend up through the cross bars to receive the ends of the brace bars. As will be seen, the brace member may thus be readily fitted in position extending between the cross bars 11 so that when it is desired to move the truck from place to place with a load thereon, this brace member will prevent the flexing of the side portions of the arch bar 10 relative to each other and will serve to rigidly brace said bar. On the other hand, whenever the brace member is found to be in the way, said member may, as shown in Fig. 1, be detached.

Having thus described the invention, what is claimed as new is:

1. A hoisting truck comprising an arch, foot members secured to the ends of the arch, rollers having the upper extremities of their frames swiveled in and projecting above the ends of said foot members, a bracing frame extending between the foot members and having its corners removably engaged over the projecting swivels of the roller frames, and a hoisting mechanism slidably mounted on the top member of the arch.

2. A hoisting truck comprising an arched bar, T-shaped in cross section, rolling supports attached to the ends of said bar, a yoke slidably mounted on the top member of the arched bar, said yoke being T-shaped whereby canting of the same upon the bar is prevented, and a hoisting mechanism suspended from said yoke.

3. A hoisting truck comprising an arched bar, T-shaped in cross section, rolling supports secured to the ends of said bar, keepers each consisting of lugs straddling and secured to the outwardly projecting web of the arched bar, a fork projecting outwardly from the lugs and provided with alined notches in the upper edges of its prongs, handles connected to the ends of the arched bar for free movement and adapted at their free ends to enter said forks, and cross pins at the free ends of the handles to seat in said notches.

In testimony whereof I affix my signature.

GEORGE W. JACKSON. [L. S.]